US009302354B2

(12) United States Patent
Nevatia

(10) Patent No.: US 9,302,354 B2
(45) Date of Patent: Apr. 5, 2016

(54) PROCESS OF SETTING STONE IN JEWELLERY BY USING COMPUTER AIDED NUMERICALLY CONTROLLED SYSTEM

(71) Applicant: Shishir Nevatia, Mumbai (IN)

(72) Inventor: Shishir Nevatia, Mumbai (IN)

( * ) Notice: Subject to any disclaimer, the term of this patent is extended or adjusted under 35 U.S.C. 154(b) by 200 days.

(21) Appl. No.: 13/947,025

(22) Filed: Jul. 20, 2013

(65) Prior Publication Data

US 2015/0020356 A1    Jan. 22, 2015

(51) Int. Cl.
*A44C 17/04*    (2006.01)
*B23P 5/00*    (2006.01)
*A44C 27/00*    (2006.01)

(52) U.S. Cl.
CPC ............... *B23P 5/00* (2013.01); *A44C 17/043* (2013.01); *A44C 27/00* (2013.01); *Y10T 29/23* (2015.01)

(58) Field of Classification Search
CPC .............. Y10T 29/23; Y10T 29/49593; Y10T 29/49922; B23P 5/00; A44C 27/00; A44C 17/00; A44C 17/04; A44C 17/043; A44C 17/046
See application file for complete search history.

(56) References Cited

U.S. PATENT DOCUMENTS

| 4,748,728 | A | * | 6/1988 | Magnien et al. .................. 29/10 |
| 5,116,174 | A | * | 5/1992 | Fried et al. ...................... 409/79 |
| 5,806,158 | A | * | 9/1998 | Wang ................................ 29/10 |
| 7,937,173 | B2 | * | 5/2011 | Weill et al. ...................... 700/86 |

* cited by examiner

*Primary Examiner* — David Bryant
*Assistant Examiner* — Ruth G Hidalgo-Hernandez

(57) ABSTRACT

A process of setting stone in jewelry by using computer aided numerically controlled (CNC) system. Precious metal is cut and bent around stone using CNC machine. The process exploits capability of CNC machine by achieving gradual and consistent bending which results in minimum residual stress in precious metal and eliminates possibility of damage to stone.

11 Claims, 7 Drawing Sheets

US 9,302,354 B2

PROCESS OF SETTING STONE IN JEWELLERY BY USING COMPUTER AIDED NUMERICALLY CONTROLLED SYSTEM

FIELD OF THE INVENTION

The Present invention describes a process of setting stone in jewelry by using computer aided numerically controlled (CNC) system.

OBJECTIVE

The objective of this invention is to invent an easy and automated process of setting stone in jewelry.

Another objective is to invent a process of stone setting which produces lesser residual stress in precious metal.

Yet another objective is to invent process of stone setting which results in minimum rejection due to stone damage

BACKGROUND OF THE INVENTION

Use of stones as decorative elements of jewelry is prevalent since ages. Various precious and semiprecious stones are used which are fixed in precious metals. Conventional method of stone setting comprises of manually bending of metal around stone using a hammer and chisel. Thus the stone gets entrapped in the metal groove. However, the quality of product thus produced depends on attention and skill of the operator and therefore inconsistent products are produced.

Another Method of manual setting is the use of pressing machine with pre-made hardened tool which presses the precious metal around the stone as described in Patent WO9829005A1 (Publication Number) However this Process is dependent on the length of the stroke which operator applies. In other words, the dependence on operator remains, though of a lower order.

U.S. Pat. No. 6,095,256 and U.S. Pat. No. 3,747,692 describe the process of manual stone setting where oscillating pneumatic hammer is used for pressing metal against stone; Here too, the dependence on operator's skill in pressing of the metal sheet obliquely against the Precious stone remains important.

Patent US20070204464 A1 describes use of machines for cutting jewelry items. This method may not result in operator fatigue but still depends on his skills in operating machine.

Thus all the known processes of setting stone eventually depend on mechanical skill. Even a skilled operator cannot produce consistent output depending on the various constraints. Our Invention overcomes these problems and improves productivity.

STATEMENT OF INVENTION

Our invention uses CNC machine for setting stone in precious metal. By using a master-stone, which is referentially equivalent of the stone to be set, and which is made of any metal or substantially equivalent hard material, the boundary dimensions of the stone are captured by manual X and Y direction movement of the dual purpose pressing tool, mounted on CNC machine. The dimensions thus captured are converted to computer language by the converter and fed to computer.

With reference to dimensions thus fed, instructions are released from computer to Converter which converts and releases instructions in machine language to produce desired X, Y and Z direction movement in CNC machine, with or without rotation as desired.

CNC machine caries out pressing of the metal sheet obliquely against the Precious stone in micro-steps and simultaneously smoothens the metal surface thereby folding the edge of metal for securing the stone in precious metal.

By virtue of the above process being gradual & consistent, it thereby produces lesser residual stress in metal. Probability of stone damaging is also minimized.

DETAILED DESCRIPTION OF INVENTION

Before any embodiments of the invention are explained in detail, it is to be understood that the invention is not limited in its application to the details of construction and arrangement of components set forth in the following description or drawings. The invention is capable of other embodiments and of being practiced or being carried out in various ways.

Figure 1:
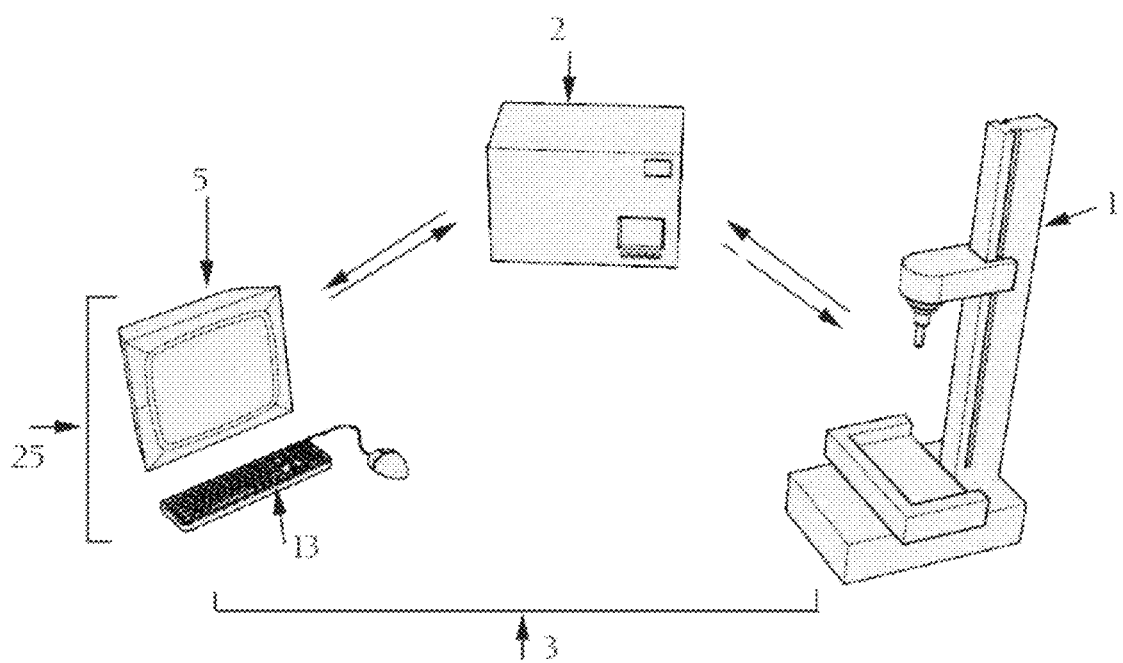
FIG. 1 shows the Computer aided numerically controlled system comprising of interconnected CNC machine, Convertor and Computer.
Figure 2:
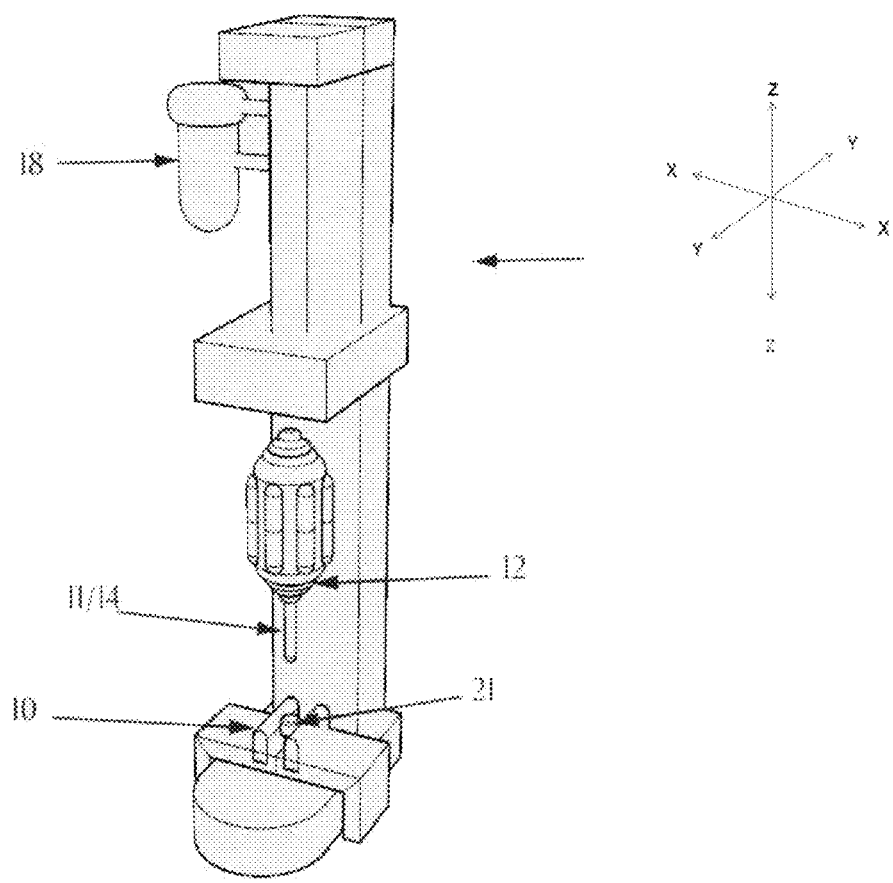
FIG. 2 shows CNC machine with master-stone held in fixture.

FIG. 1 shows our invented system (3) of stone setting, comprising a computer aided numerically controlled (henceforth called CNC) Machine (1), Converter (2) and computer system (25) with display (5) and input devices (13). The system is electrically interconnected such that computer instructions are converted in machine language which is received by the CNC machine and it accordingly produces linear and rotary movements.

It is possible that computer system has integral converter and therefore directly transacts in machine language compatible with CNC machine.

CNC machine (1) comprises of:

(a) Motor-Gear mechanism (18) which provides X and Y axis linear movement to Fixture (10) and which pro vides Z axis movement to pressing tool (11) or Cutting tool (14) and which provides rotary movement around Z axis to Cutting tool (14);

(b) Fixture (10) for holding master-stone (16) or (16A), or Jewelry (23) wherein the stone (21) is to be set, (c) Tool holder (12) for holding tool (14/11).

(d) Relays (not explicitly shown) which switch ON or OFF as per commands received and thereby produce correspondingly desired movement.

The Converter (2) converts the computer language into machine language and vice versa.

Display (5) of the computer (25) is used for visually relating & monitoring; and input devices (13) facilitate keying in inputs.

Figure 3:
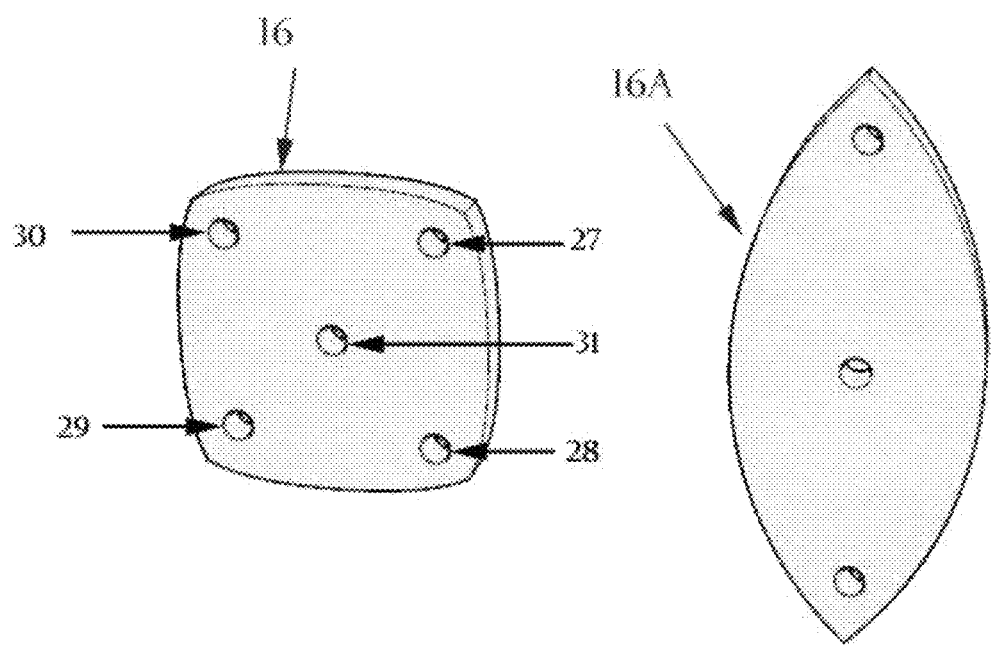
FIG. 3 shows the illustrative master-stones with depressions used for setting reference.
Figure 4:
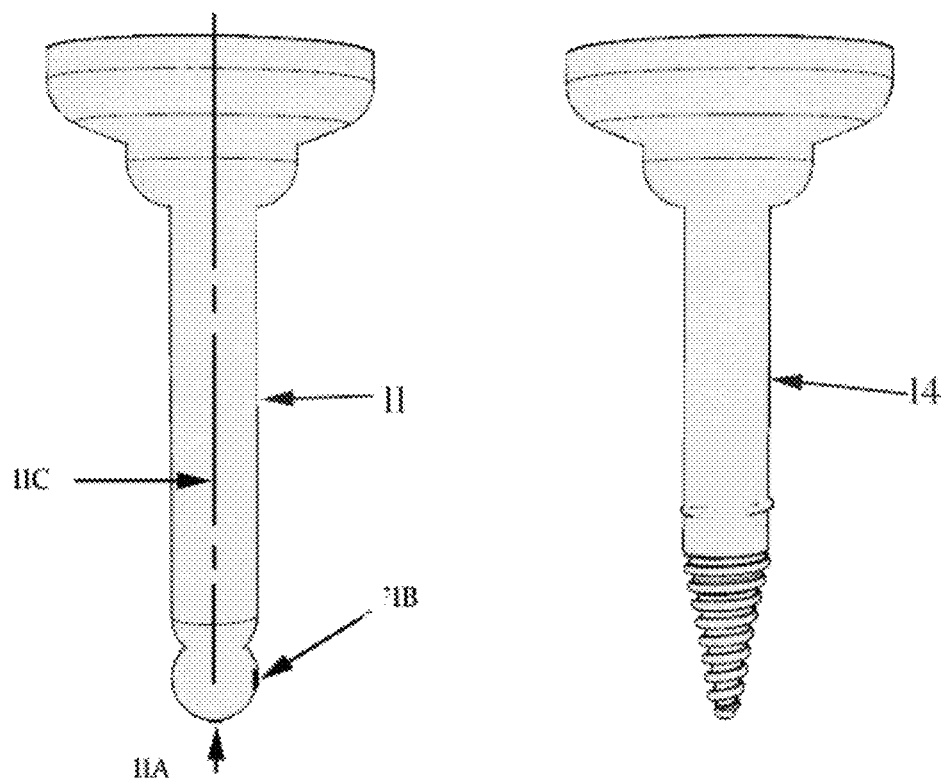
FIG. 4 shows pressing tool and cutting tool deployed for the embodiment.

FIG. 3 describes herein two kinds of shapes of master-stone (16) and (16A) used for setting reference, and they relate to corresponding shapes of stone to be set in jewellery. Description provided in this embodiment is with respect to master-stone (16) but the invention is not limited to shapes (16) and (16A). Master-stone has depression (31) in the centre known as a central depression and (27, 28, 29, 30) at the extremes known as a plurality of extreme depressions for setting up reference.

Pressing tool (11) has bottom tip (11A) of such shape that when pressing tool is made to firmly seat over any of the plurality of extreme depressions (27, 28, 29, 30, 31); its axis (11C) aligns substantially with the centre of any of the plurality of extreme depressions (27, 28, 29, 30,31). Thus, the bottom tip (11A) is used for setting reference while side of the tool is used for pressing the metal and thus the tool serves two or dual purpose.

Figure 6:
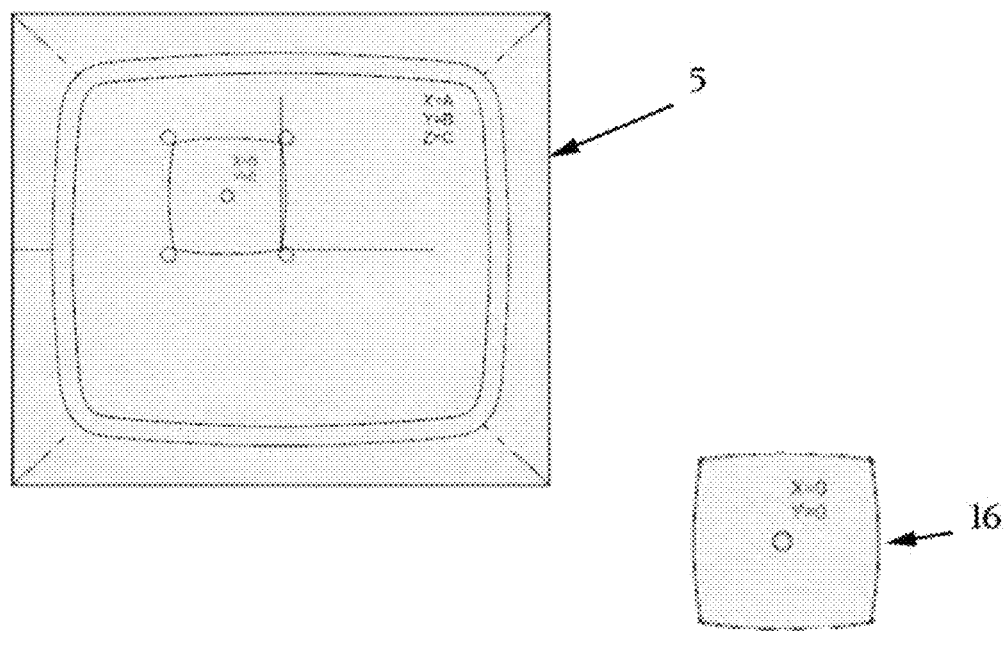
FIG. 6 shows calibrating referencing relationship.

To set references, Master-stone (16) is held in the fixture (10). Pressing tool (11) is manually lowered and made to firmly seat over the central depression (31). Correspondingly on the screen some value of the X and Y co-ordinates appears forming a first reference point. By input device (13), the value of co-ordinates corresponding to the central depression (31) is changed to X=0 and Y=0. Thus is set the calibrating reference point. FIG. 6 facilitates this understanding.

Further, the pressing tool (14) is manually made to firmly seat over the plurality of extreme depressions (27, 28, 29 and 30) and correspondingly now the computer calculates and registers their X and Y co-ordinates i.e. other reference points, taking co-ordinates of the central depression (31) as X=0 and Y=0, which is calibrating reference point. This way, overall configuration of the shape of the stone to be fixed in jewellery e.g. (16) or (16A) etc. is set.

Next, the master-stone (16) is replaced by item of jewellery (20). Corresponding to this item of jewellery (20) and with details of reference points (27,28,29,30,31), the computer (25) computes required movement of the tools (11/14) to achieve desired shape, based on instructions previously stored in its memory.

Figure 5:
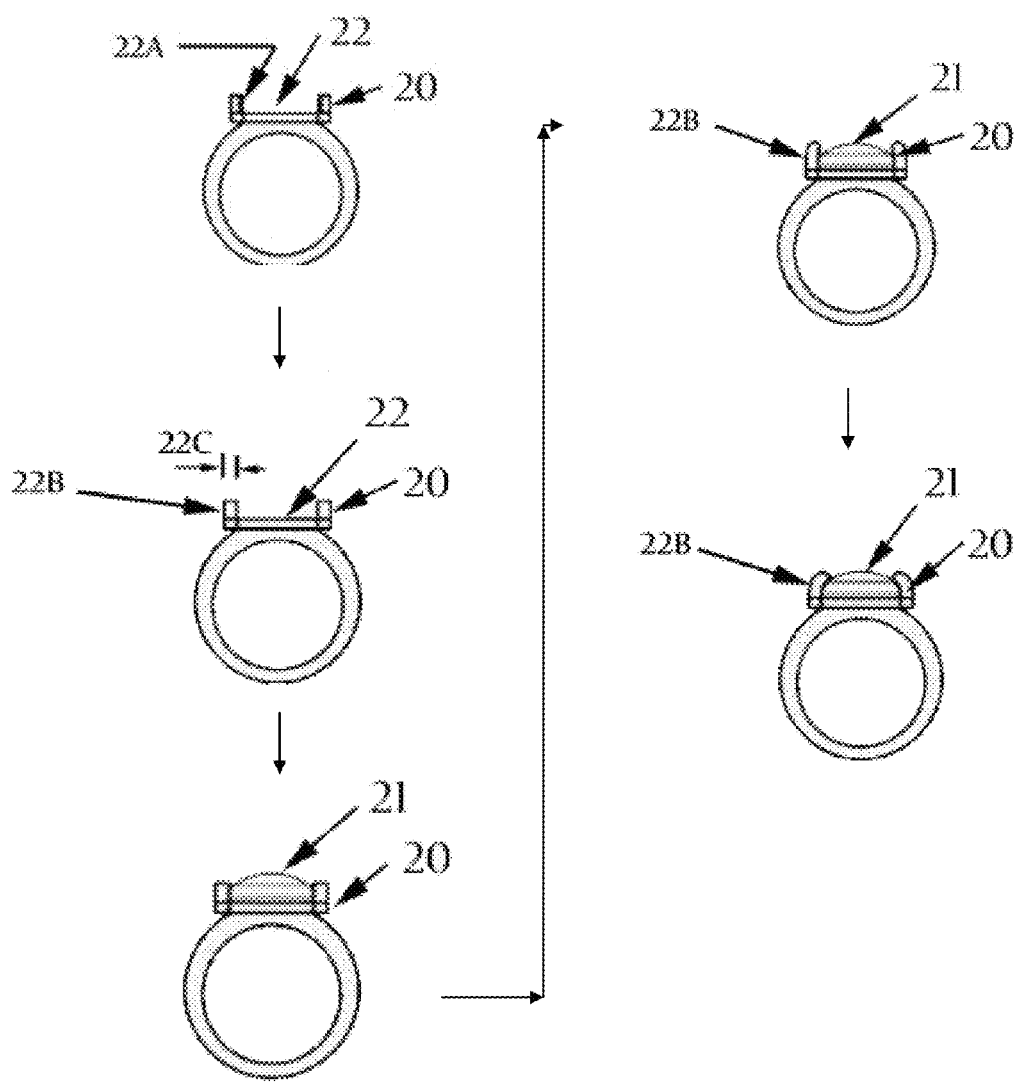
FIG. 5 shows illustrative progressive stages of stone setting.

Computed output from computer (25) generates sequence of instructions to converter (2) which issues instructions in machine language to CNC machine (1) to carry out following as shown in FIG. 5:

(a) Removing of irregularity (22A) and achieve dimensions corresponding to limits set by the plurality of extreme depressions (27, 28, 29 and 30) by using cutting tool (14) by issuing command so as to generate rotary movement causing cutting action, generate movement in Z axis and progressive and incremental movement in X and Y axis, one axis at a time.

Figure 7:
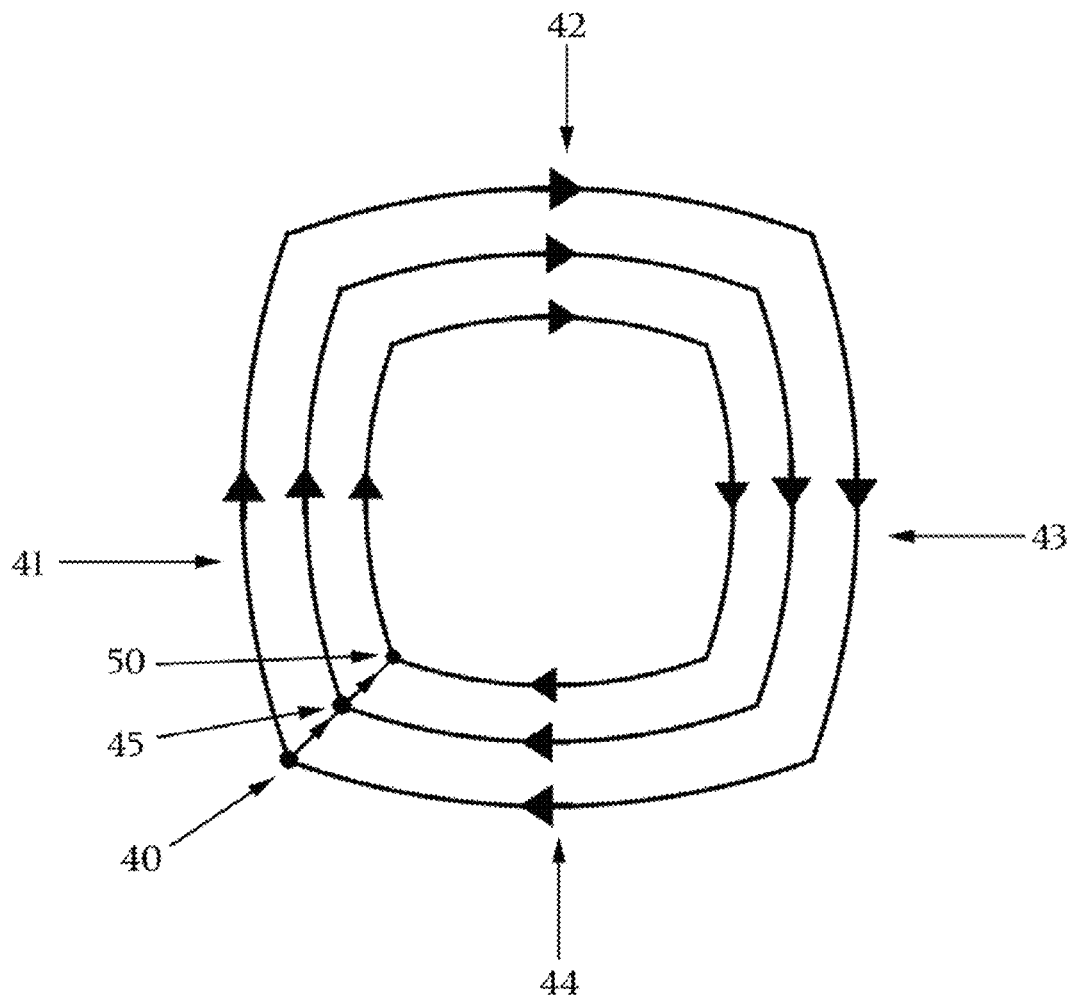
FIG. 7 shows illustrative trajectory of movement of tool.

(b) Progressive inward bending of vertical wall (22B) by using pressing tool (11) by issuing command so as to generate movement in Z axis and progressive and incremental movement in X and Y axis, as per trajectory described in FIG. 7.

After completing operation as in (a) above, the stone is manually placed in the socket (20). Also, cutting tool (14) is removed and pressing tool (11) is mounted in the tool holder (12).

For operation as in (b) above, the pressing tool is made to firmly touch the vertical wall (22B) from outside. It then follows the trajectory (41 to 42, 42 to 43, 43 to 44, 44 to 45). Since the required inside dimension is known due to prior setting of other references points (27, 28, 29 and 30), the computer computes the total incremental movement (point 40 to point 45)+(point 45 to point 50)+ . . . needed to achieve required bend and therefore, the process is independent of variation in thickness (22C) in the vertical wall.

Various shapes of master-stones can be used depending upon the jewelry. The tool movement trajectory i.e. the path of the movement of tool as shown in FIG. 7 varies and is calculated by CNC system depending upon the referencing points, through which the CNC system gets inputs of shape of stone. The least count of the X,Y movement, (on which depends the setting of distance from point 40 to point 45, point 45 to point 50, . . . ) of this system is as low as less than 0.1 mm and therefore the process of setting stone is more gradual than any manual process, since the incremental movements are small. This results in minimal residual stress in the metal.

The system computes required incremental X and Y movement to the accuracy of less than 0.1 mm Thus there is no possibility of stone getting excessively pressed or getting damaged.

What is claimed is:

1. A process of setting a stone in jewelry by using a computer aided numerically controlled system, having a CNC Machine, a computer system and a converter, wherein the converter converts a computer language into a machine language and vice versa, the process comprising the steps of:
setting reference points by:
holding a master-stone on a fixture of the CNC machine, the master-stone having a plurality of depressions;
pressing a bottom tip of a pressing tool, manually, on one of the plurality of depressions of the master-stone;
setting a first reference point on one of the plurality of depressions of the master-stone by calibrating an X co-ordinate and a Y co-ordinate and setting the first reference point to zero;
pressing the bottom tip of the pressing tool, manually, on each of the rest of the plurality of depressions of the master-stone;
registering other reference points as an X co-ordinate and a Y co-ordinate on the rest of the plurality of depressions of the master-stone;
replacing the master-stone with an item of jewelry in the fixture of the CNC machine, the jewelry having vertical walls of metal;
computing a required movement of said CNC machine corresponding to the other reference points on the master-stone, to form a tool movement trajectory;
removing of irregularity of the jewelry with a cutting tool and achieving a dimension corresponding to a limit set by the first reference point and the other reference points on the master-stone;
placing a stone, manually, between the vertical walls of metal,
bending the vertical walls progressively inwardly using the tool movement trajectory computed using the other reference points on the master-stone, wherein the step of bending sets the stone within the jewelry.

2. The process of setting a stone in jewelry as claimed in claim 1, wherein said CNC machine has a linear movement in the X co-ordinate and the Y co-ordinate, and a rotary movement along a Z co-ordinate.

3. The process of setting a stone in jewelry as claimed in claim 1, wherein said master stone having the first reference point is a central depression of the plurality of depressions and the other reference points are extreme depressions of the plurality of depressions.

4. The process of setting a stone in jewelry as claimed in claim 1, wherein said pressing tool having the bottom tip is used for bending the vertical walls of metal, calibrating the first reference point and registering the other reference points on the master-stone.

5. The process of setting a stone in jewelry as claimed in claim 1, wherein said reference points are selected by the setting of a value of the X co-ordinate and the Y co-ordinate of a central depression of the plurality of depressions as the first reference point on the master-stone by the pressing tool and by registering values of the X co-ordinate and the Y co-ordinate of each extreme depression of the plurality of depressions as the other reference points.

6. The process of setting a stone in jewelry as claimed in claim 1, wherein said jewelry is held in the fixture using the first reference point and the other reference points on the master stone.

7. The process of setting a stone in jewelry as claimed in claim 1, wherein said step of computing the required movement of said CNC machine involves use of instructions previously stored in a memory and depends upon the first reference point and the other reference points on the master-stone.

8. The process of setting a stone in jewelry as claimed in claim 1, wherein said step of setting the first reference point and the registering of the other reference points involves formation of commands of a small incremental movement that are set for the CNC machine.

9. The process of setting a stone in jewelry as claimed in claim 2, wherein said linear movement and said rotary movement is controlled via a motor gear mechanism of the CNC machine.

10. The process of setting a stone in jewelry as claimed in claim 8, wherein said small incremental movement allows a minimal residual stress on the metal of the vertical walls of the jewelry.

11. The process of setting a stone in jewelry as claimed in claim 1, wherein the step of bending the vertical walls of metal is independent of variations in thickness of the vertical walls.

* * * * *